United States Patent [19]

Makowski et al.

[11] 4,316,828

[45] Feb. 23, 1982

[54] BULK NEUTRALIZATION

[75] Inventors: Henry S. Makowski, Scotch Plains; Robert D. Lundberg, Bridgewater, both of N.J.; Jan Bock, Houston, Tex.

[73] Assignee: Exxon Research & Engineering Co., Florham Park, N.J.

[21] Appl. No.: 47,753

[22] Filed: Jun. 12, 1979

Related U.S. Application Data

[63] Continuation of Ser. No. 855,723, Nov. 29, 1977, abandoned.

[51] Int. Cl.³ ............................................... C08L 91/00
[52] U.S. Cl. ........................... 260/23.5 A; 260/23.7 B; 260/27 BB; 260/33.6 AQ; 260/33.6 PQ; 260/34.2; 260/42.47; 260/DIG. 31

[58] Field of Search ......... 260/42.47, 42.33, 33.6 AQ, 260/33.6 PQ, 34.2, 23.5 A, 23.7 B

[56] References Cited

U.S. PATENT DOCUMENTS 3,642,728  2/1972  Canter ........................... 260/23.5 A
3,974,241  8/1976  Lundberg et al. ............. 260/23.5 A

*Primary Examiner*—Lewis T. Jacobs
*Attorney, Agent, or Firm*—Richard E. Nanfeldt

[57] ABSTRACT

An improved process for the manufacture of extended gel free sulfonated elastomeric products includes the formation of a homogeneous mixture of fillers and oils with the acid form of the sulfonated polymer prior to the neutralization of the acid form of the sulfonated polymer with a basic material thereby resulting in a composition having improved physical properties.

13 Claims, No Drawings

BULK NEUTRALIZATION

This is a continuation of application Ser. No. 855,723, filed Nov. 29, 1977, and now abandoned.

BACKGROUND OF THE INVENTION

1. Field of the Invention

An improved process for the manufacture of extended gel free sulfonated elastomeric products includes the formation of a homogeneous mixture of fillers with the acid form of the sulfonated polymer prior to the neutralization of the acid form of the sulfonated polymer with a basic material thereby resulting in a composition having improved physical properties.

2. Description of the Prior Art

This invention relates to a unique and novel improved process for forming extended elastomeric blends of sulfonated elastomeric polymers.

Recently a new class of sulfonated polymers has been described in a number of U.S. Pat. Nos. 3,642,728; 3,836,511; 3,870,841 and 3,847,854, herein incorporated by reference.

U.S. Pat. No. 3,642,728 teaches a method of selective sulfonation with an $SO_3$ donor of olefinic unsaturation sites of an elastomeric polymer to form an acid form of a sulfonated elastomeric polymer. U.S. Pat. No. 3,642,728 recognized that the free sulfonic acid of the sulfonated elastomer decomposed at conventional rubber processing temperatures and thereby required that a substantial portion of the sulfonic acid be neutralized prior to isolation. It further recognized that optimum thermal stability is reached at total neutralization; however, the melt viscosities of the fully neutralized systems are extremely high. Consequently the fully neutralized systems are extremely difficult, if not impossible, to process in conventional equipment under conventional conditions.

U.S. Pat. No. 3,836,511 teaches an improved method of sulfonation of the olefinic sites of the elastomeric polymer, wherein the improved sulfonating agent is an acyl sulfate. The acid form of the sulfonated elastomeric polymer is neutralized with an organic amine to produce a neutralized sulfonated elastomeric polymer having rather inferior physical properties due to a low degree of ionic association.

The extremely high viscosities of the compositions of U.S. Pat. No. 3,642,728 and the poor physical properties of the compositions of U.S. Pat. No. 3,836,511 limit their usefulness.

U.S. Pat. Nos. 3,870,841 and 3,847,854 teach a method of plasticization of the polymeric backbone of a neutralized sulfonated polymer. The plasticizing agent is incorporated into the sulfonated polymer by hot mixing the neutralized sulfonated polymer with the plasticizing agent. Although, the rheological properties are improved, the incorporation of these plasticizing agents into the neutralized sulfonated polymers is extremely difficult and usually results in a general decrease in physical properties.

The aforementioned patents teach methods of compounding the additives into the neutralized sulfonated elastomeric polymer under high heat and shear conditions or the use of an organic amine neutralizing agent thereby resulting in compositions either having poor rheological or physical properties.

The present invention teaches a new improved process for forming improved compositions of matter which includes forming a homogeneous mixture of an acid form of a sulfonated elastomeric polymer, a mineral or a carbon black filler, and a non-polar process oil, and subsequently neutralizing the sulfonated polymer, wherein the resultant extended elastomeric blends have improved physical properties while maintaining acceptable rheological properties.

SUMMARY OF THE INVENTION

It has been surprisingly found that filled and extended gel-free sulfonated elastomeric products having improved physical and rheological properties can be readily produced by compounding mineral or carbon black fillers and non-polar process oils into a sulfonated elastomeric polymer prior to neutralization. In particular, the acid form of a sulfonated elastomeric polymer is mixed with the appropriate oil extenders and mineral or carbon black fillers under shear such as on a two roll mill until a homogeneous mixture has been achieved. The acid form of the sulfonated elastomeric polymer is then at least partially neutralized with a neutralizing agent. Further neutralization can be achieved during fabrication of the elastomeric product into its final useable form.

GENERAL DESCRIPTION OF THE PRESENT INVENTION

This present unique and novel instant invention relates to an improved process for the manufacture of filled and extended neutralized sulfonated elastomeric polymers, wherein the sulfonated elastomeric polymers are derived from olefinically unsaturated elastomeric polymers. The term "olefinically unsaturated polymer" as used in the specification means polymers both synthetic or natural having in the polymer structure sites of unsaturation whether in the backbone, pendant therefrom or cyclic, except that aromatic containing polymers are excluded from this description.

In particular, unsaturated polymers of this invention include low unsaturation polymers having about 0.1 to about 10 mole percent olefinic unsaturation such as Butyl rubber, halogenated Butyl rubbers, or EPDM terpolymers. Additionally, other unsaturated polymers contemplated are: partially hydrogenated polyisoprenes, partially hydrogenated polybutadienes, isoprene-styrene copolymers, and butadiene-styrene copolymers.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000 especially about 100,000 to about 400,000, and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably about 1 to about 4%, e.g. 2%.

Illustrative of such a Butyl rubber is Exxon Butyl 365 (Exxon Chemical Co.), having a mole percent unsaturation of about 2.0% and a Mooney viscosity (ML, 1+8, 212° F.) of about 40–50.

Halogenated Butyl rubber is available commercially and is prepared through the halogenation of Butyl rubber in solution. The preparation of halogenated Butyl rubber is described in U.S. Pat. No. 3,099,644 which is incorporated herein by reference.

Illustrative of a halogenated Butyl rubber is Exxon Chlorobutyl 1066, a chlorinated Butyl rubber containing about 1.3 wt. % chlorine, having about 1.7 mole percent unsaturation, and a viscosity average molecular weight of about 357,000.

Low molecular weight Butyl rubbers, i.e. Butyl rubbers having a viscosity average molecular weight of about 5,000 to 85,000 and a mole percent unsaturation of about 3 to about 4% may be sulfonated by the process of this invention. Preferably, these polymers have a viscosity average molecular weight of about 25,000 to about 60,000.

The EPDM terpolymers are low unsaturated polymers having about 1 to about 10.0 wt. % olefinic unsaturation, more preferably about 2 to about 8, most preferably about 3 to 7, defined according to the definition as found in ASTM-D-1418-64 and is intended to mean a terpolymer containing ethylene and propylene in the backbone and a diene in the side chain. Illustrative methods for producing these terpolymers are found in U.S. Pat. No. 3,280,082, and French Pat. No. 1,386,600, which are incorporated herein by reference. The preferred terpolymers contain about 40 to 75 wt. % ethylene and about 1 to about 10 wt. % of a diene monomer, the balance of the polymer being propylene. Preferably, the polymer contains about 50 to about 70 wt. % ethylene, e.g. 50 wt. % and about 2.6 to about 9.0 wt. % diene monomer, e.g. 5.0 wt. %. The diene monomer is preferably a nonconjugated diene. The $\overline{M}n$ of the terpolymer is preferably about 10,000 to about 200,000; more preferably, about 15,000 to about 100,000; and most preferably about 20,000 to about 60,000. The Mooney viscosity (ML, 1+8, 212° F.) of the terpolymer is preferably about 5 to about 60, more preferably about 10 to about 50 and most preferably about 15 to about 40. The $\overline{M}v$ of the EPDM is preferably below about 350,000 and more preferably below about 500,000 and more preferably below about 350,000.

Illustrative of these nonconjugated diene monomers which may be used in the EPDM terpolymer are 1,4-hexadiene, dicyclopentadiene, 5-ethylidene-2-norbornene, 5-methylene-2-norbornene, 5-propenyl-2-norbornene and methyl tetrahydroindene.

A typical EPDM is Vistalon 2504 (Exxon Chemical Co.) a terpolymer having a Mooney viscosity (ML, 1+8, 212° F.) of about 40 and having 50 wt. % of ethylene, 45 wt. % of propylene and 5.0 wt. % of 5-ethylidene-2-norbornene with an $\overline{M}n$ of about 47,000, an $\overline{M}v$ of about 145,000 and an Mw of about 174,000.

Vistalon 3708 (Exxon Chemical Co.) is a terpolymer having a Mooney viscosity (ML, 1+8, 260° F.) of about 45–55 and having about 64 wt. % of ethylene, about 3.3 wt. % of 5-ethylidene-2-norbornene, and about 32.7 wt. % of propylene with an $\overline{M}n$ of about 53,000, an $\overline{M}n$ of about 343,000 and an Mv of about 270,000.

Vistalon 6505 (Exxon Chemical Co.) is a terpolymer having a Mooney viscosity (ML, 1+8, 260° F.) of about 45–55 and having about 53 wt. % of ethylene, about 9.0 wt. % of 5-ethylidene-2-norbornene and about 38 wt. % of propylene.

Other EPDM terpolymers Vistalon 2504-20 and Vistalon 6505-20 are derived from Vistalon 2504 and Vistalon 6505 by a controlled extrusion process, wherein the resultant Mooney viscosity at 212° F. is about 20. The $\overline{M}n$ of Vistalon 2504-20 is about 26,000, the $\overline{M}v$ is about 90,000 and the Mw is about 125,000.

Nordel 1320 (DuPont) is another EPDM terpolymer having a Mooney viscosity at 212° F. of about 25 and having about 53 wt. % of ethylene, about 3.5 wt. % of 1,4-hexadiene, and about 43.5 wt. % of propylene.

In carrying out the present invention, an olefinically unsaturated polymer is sulfonated with a sulfonating agent selected from an acyl sulfate, a mixture of sulfuric acid and an acid anhydride or a sulfur trioxide donor complexed with a Lewis base containing oxygen, nitrogen, or phosphorous.

The term "sulfur trioxide donor" as used in the specification means a compound containing available sulfur trioxide. Illustrative of such sulfur trioxide donors are $SO_3$, chlorosulfonic acid, fluorosulfonic acid, sulfuric acid, oleum, etc. The term "complexing agent" as used in the specification means a Lewis base suitable for use in the practice of this invention, wherein a Lewis base is an electron pair donor. Typical Lewis bases are: dioxane, tetrahydrofuran, tetrahydrothiophene or triethyl phosphate.

The molar ratio of $SO_3$ donor to complexing agent may be as high as 15 to 1; preferably less than about 9:1; more preferably about 4:1 to about 1:1, e.g. 2:1.

The preferred solvents for preparation of the complexes of sulfur trioxide donor with complexing agents are chlorinated hydrocarbons. Illustrative of such chlorinated solvents are carbon tetrachloride, dichloroethane, chloroform, and methylene chloride. The complexes may also be prepared by direct addition of reagents if precautions are taken to dissipate evolved heat.

The reactions of ethereal complexes of $SO_3$ with the unsaturation of polymer chains has been found to be nonquantitative generally because they are consumed through side reactions with impurities such as water. Therefore, the use of excess complex is desirable to give the required amount of sulfonation.

Other suitable sulfonating agents are the acyl sulfates, which are selected from the group of acetyl, propionyl, butyryl, or benzoyl sulfate, in particular acetyl sulfate. The acyl sulfate may be produced by reacting concentrated sulfuric acid with an acid anhydride or an acid halide in the presence or the absence of a solvent. For example, acetic anhydride may be reacted with sulfuric acid to form acetyl sulfate which may be used to sulfonate the polymers of this invention. If desired, acetic anhydride may be added to a solution of the polymer in a suitable solvent and sulfuric acid subsequently added to form acetyl sulfate in situ. Alternatively, acetyl sulfate may be preformed by reaction of sulfur trioxide with acetic acid in a non-reactive solvent.

It should be pointed out that neither the sulfonating agent nor the manner of sulfonation is critical, provided that the sulfonation method does not degrade the polymer backbone.

In the practice of this invention, the polymer to be sulfonated is dissolved in a suitable solvent and reacted with the sulfonating agent. The solvent medium must be a neutral one for the rubber and the sulfonating agent. The solvent is preferably an aromatic hydrocarbon, an aliphatic hydrocarbon, a cycloaliphatic hydrocarbon or a halogenated aromatic hydrocarbon. Illustrations of these solvents are: isopentane, pentane, cyclohexane, isohexane, hexane, heptane and homologues thereof, benzene, toluene, chlorobenzene or xylene. The preferred solvent is an aliphatic hydrocarbon.

Sulfonation of the polymer is conducted at a temperature between $-100°$ C. and $+100°$ C. Sulfonation occurs when the sulfonating agent is added to the polymer solution. The sulfonating agent is dissolved in a suitable solvent, or may be added directly without solvent. With acetyl sulfate reagent it is most preferred to add acetic anhydride to the polymer cement and then sulfuric acid to prepare the acetyl sulfate reagent in situ. Reaction time may be about 1 to about 60 minutes, more preferably about 5 to about 45 and most preferably about 15 to about 30, wherein the product remains soluble throughout the reaction period.

The acid form of the sulfonated elastomeric is quenched with water, or a liquid aliphatic alcohol such as methanol, ethanol or isopropanol, an aromatic hydroxyl compound such as phenol, or a cycloaliphatic alcohol such as cyclohexanol. The product can most easily be recovered by flashing off the solvent in hot water, wherein the water also decomposes the unreacted sulfonating agent. The product may also be recovered by evaporation of the solvent by a suitable means.

The wet crumb is thoroughly washed with water to remove soluble reagent components, such as sulfuric acid, acetic acid, and tetrahydrofuran, and low molecular weight, water-soluble sulfonic acids which derive from the reagent components, such as sulfoacetic acid. Washing improves tthe stability of the polymeric sulfonic acid and reduces the corrosiveness of the wet crumb. The water content of the screened and drained wet crumb is generally about 50 wt. % to about 80 wt. % depending upon the size of the crumb and conditions of operation. The water content of the steam stripped polymer may be reduced through washing with low boiling ketones or alcohols, such as acetone and methanol, although this is neither necessary nor preferred.

After thorough washing of the crumb of the polymeric sulfonic acid the crumb is mechanically dewatered at a temperature below about 150° F. This is readily accomplished with a variety of commercial equipment such as a two-roll mill, a dewatering extruder, an expeller, a filter press, a rotary drum filter, a Reitz V-press, and a centrifuge. Combinations of such equipment can be used to reduce the water content of the polymeric sulfonic to the desired level. It is desirable to lower the water level of the elastomeric sulfonic acid to less than about 15 wt. %, preferably less than about 10 wt. %, and most preferably less than about 5 wt. %. These lower levels of water are easily achieved through a combination of mechanical, shearing, and thermal effects.

The elastomeric sulfonated polymer is formulated and mixed with a combination of fillers, extender oils and additives, and appropriate bases are added during or after the mixing step to effect at least partial neutralization of the sulfonic acid. During this compounding step the shearing required to mix the components and the temperature developed as a result of this shearing action result in further loss of moisture. Complete neutralization of the formulation is achieved during fabrication such as a molding or extrusion process at elevated temperature into a useful end product. The molded or extruded article is essentially totally free of moisture at the end of the molding or extrusion cycles. In cases where the formulated and fully neutralized product has sufficiently low melt viscosity for refabrication, the formulated product can be extruded and pelletized, and the resultant pellets can be further dried if necessary to achieve the desired level of moisture.

The elastomeric polymeric acid is soluble in a variety of solvent combinations, for example, toluene with a minor amount of methanol. This solubility demonstrates that sulfonation has occurred without crosslinking. The sulfonic acid-containing polymers have improved physical properties over those of the unsulfonated polymers which is attributable to the hydrogen bonding of the sulfonic acid groups.

The amount of desirable sulfonation depends on the particular application. Preferably, the elastomeric polymer is sulfonated at about 10 to about 60 meq. $SO_3H/100$ g of polymer, more preferably at about 15 to about 50 meq. $SO_3H/100$ g of polymer and most preferably at about 20 to about 40 meq. $SO_3H/100$ g. of polymer. The sulfonic acid content can be determined by either titration of the polymeric sulfonic acid or Dietert Sulfur analysis. In the titration of the sulfonic acid the polymer is dissolved in solvent consisting of 95 parts of toluene and 5 parts of methanol at a concentration level of 50 grams per liter of solvent. The acid form is titrated with ethanolic sodium hydroxide to an Alizarin Thymolphthalein endpoint.

The acid form of the sulfonated polymer is gel-free and hydrolytically stable. Percent gel is measured by stirring the sulfonated polymer in a solvent comprised of 95 vol. % toluene/5 vol. % methanol at a concentration of 5 wt. %, for 24 hours, allowing the mixture to settle, withdrawing a weighed sample of the supernatant solution and evaporating to dryness.

Hydrolytically stable means that the acid function, in this case the sulfonic acid, will not be eliminated under hydrolytic conditions to a neutral moiety which is incapable of being converted to a highly ionic functionality.

As described in U.S. Pat. No. 3,642,728, herein incorporated by reference, the free polymeric sulfonic acid suffers from thermal instability. In addition the physical properties of the free polymeric acid are not very good. Although the polymeric sulfonic acid has improved properties over the unsulfonated elastomer as a result of relatively weak interactions between the sulfonic acid groups these properties are generally unsatisfactory and insufficient for most applications. Strong ionic interactions leading to thermal stability and markedly improved physical properties are achieved only through neutralization of the sulfonic acid to form the corresponding metal or ammonium salt. The free acid has poor physical properties because of the weak sulfonic acid interactions but as a consequence possesses low melt viscosity and thereby good processability. The high ionic interactions in the salt have the inverse effect, i.e. good physical properties on the one hand and high melt viscosity and poor processability on the other.

The neutralizing agents of the present invention are basic salts of carboxylic acids, wherein the cation of the basic salt is selected from the group consisting of ammonium, aluminum, lead, iron, antimony or Groups IA, IIA, IB or IIB of the Periodic Table of Elements and mixtures thereof. Suitable monovalent metal ions are Na, K, Li, Cs, Ag, Hg, and Cu. Suitable divalent metal ions are Be, Mg, Ca, Sr, Ba, Cu, Cd, Hg, Sn, Fe, Pb, Co, Ni and Zn. Most preferred are zinc, magnesium, barium, sodium and lead. In preparing the ionomer the neutralizing agent is added at levels at least about 100% of stoichiometry and preferably in excess of stoichiometry.

The carboxylate ion of the metallic salt is derived from the following carboxylic acids as illustrated in the present invention; however, other carboxylic acids of the same generic class can be readily employed and are considered within the spirit and scope of the present embodiment. These carboxylic acids are: acetic, benzoic, lauric, palmitic, myristic, decanoic, octanoic, and stearic.

When neutralization is effected with a metal carboxylate a product of the neutralization is the corresponding carboxylic acid.

$$-SO_3H + R-COOM \rightarrow -SO_3M + RCOOH$$

Although the degree of efficacy varies with structure and composition, carboxylic acids are in fact ionic plasticizers, i.e. they relax ionic associations thereby decreasing apparent molecular weight, lowering melt viscosity, and improving melt processability. Low molecular weight carboxylic acids, such as acetic acid, are not very effective ionic plasticizers at low concentration and are volatile so that they are substantially lost during compounding, extrusion, and other processing steps. Thus when neutralization of the sulfonic acid is effected with a lower molecular weight metal carboxylate the resultant metal sulfonate is unplasticized resulting in a very strong ionic association, high apparent molecular weight, high melt viscosity, and poor melt processability. This result is no different than if the sulfonated polymer were neutralized in solution immediately after sulfonation. An advantage of this invention is that formulations can be fully and homogeneously mixed prior to neutralization of the polymeric sulfonic acid thereby permitting the preparation of formulations that could not have been prepared otherwise.

The higher molecular weight carboxylic acids are not volatile and remain with the neutralized gum. Because of their constitution the higher molecular weight carboxylic acids, such as lauric, palmitic, myristic, stearic, arachidic, and behenic, are excellent flow improvers, i.e. at processing temperatures viscosities are significantly reduced and flow stability is markedly improved. Thus when neutralization of the sulfonic acid is effected with a high molecular weight metal carboxylate it is accompanied by the generation of a non-volatile ionic domain plasticizer. Thus the melt viscosity of the formulation is improved through plasticizer generation. The carboxylic acid, however, has a deleterious effect upon physical properties, especially at elevated temperatures, for example 70° C.

Polyvalent cations, the most important of which are the divalent cations, such as zinc, magnesium and barium must be used in some excess of stoichiometry because it is not possible for all sulfonic acids to be neutralized with simply an equivalent amount of divalent cation. Consequently not only are disulfonate linkages, $-SO_3-M-O_3S-$, formed but also monosulfonate linkages, $-SO_3-M-OOC-R$. The relative amounts of these moieties and the type of carboxylate substituent exert a substantial effect upon both melt processability and physical properties.

Some of the higher molecular weight metal carboxylates can themselves act as effective ionic domain plasticizers for the neutralized systems when present in sufficient quantity, for example 10 parts to 30 parts per 100 of unplasticized neutralized gum. This is especially true of zinc carboxylate, such as zinc stearate, which not only functions to improve melt flow but imparts remarkable improvements on tensile properties at room temperature and at elevated temperatures. Most metal carboxylates possess little effect upon the ambient temperature tensile properties of neutralized gums and a significantly poorer effect upon melt processability than zinc stearate. As a consequence a high degree of ionic association occurs at higher temperatures.

As a consequence of the effects of higher molecular weight carboxylic acids and metal carboxylates it is possible to modulate both the melt viscosity and the physical properties of the neutralized gum not only through changes in concentration of the metal carboxylate but also through the use of mixtures in different metal carboxylates. It is further possible to modulate flow and physical properties by the conversion of the generated carboxylic acids to the corresponding metal carboxylates by reaction with the corresponding metal oxides and hydroxides.

$$-SO_3H + MO \text{ or } (MOH) \rightarrow -SO_3M + H_2O$$

Such a conversion of carboxylic acids to metal carboxylates has been described in U.S. Pat. No. 4,014,831, herein incorporated by reference. The metallic hydroxides are selected from Groups IA and IIA of the Periodic Table of Elements and mixtures thereof. Useful examples of metal hydroxides are NaOH, KOH, LiOH, Mg(OH)$_2$ and Ba(OH)$_2$. The metallic oxides are selected from the group consisting essentially of Groups IIA, IIB or lead and mixtures thereof of the Periodic Table of Elements. Illustrative examples are MgO, CaO, BaO, ZnO, PbO$_2$, or Pb$_3$O$_4$ and mixtures thereof. Especially preferred are the oxides of zinc and lead.

Neutralization of the polymeric sulfonic acid can be effected with metallic oxides alone, wherein the metallic ion is selected from the group consisting essentially of Groups IIA, IIB or lead and mixtures thereof of the Periodic Table of Elements. Illustrative examples are MgO, CaO, BaO, ZnO, PbO$_2$ or Pb$_3$O$_4$ and mixtures thereof.

Other neutralizing agents which can be used alone are basic salts of hydroxides, alkoxides, or alkanoates, wherein the cation is selected from Groups IA or IIA of the Periodic Table of Elements and mixtures thereof. Useful examples of metal hydroxides are NaOH, KOH, LiOH, Mg(OH)$_2$ and Ba(OH)$_2$.

The improved process of the present invention comprises the steps of isolation of the acid form of the sulfonated elastomeric polymer having less than 15% retained water. The acid form is mixed at a temperature of less than about 150° F. with appropriate amounts of fillers, extender oils and other additives until a homogeneous mixture has been achieved. A neutralizing agent is added to the homogeneous mixture at a level at least 100% of stoichiometry and mixing is continued until homogenity is achieved and at least partial neutralization of the acid form has been realized. Complete neutralization of the acid form can be realized in finishing operations such as extrusion and pelletization and in fabrication operations such as injection molding, extrusion, or compression molding.

The ionic associations of acid form of the sulfonated elastomeric polymer are minimal as compared to a neutralized sulfonated elastomeric polymer which cannot be easily processed due to its high ionic association.

When the fillers and oils are mixed with the sulfonated elastomeric polymer before neutralization, improved dispersion is realized due to the mobility of the elastomeric polymer molecules and its minimal ionic associations. This improved dispersion results in a sulfonated elastomeric product having improved physical and rheological properties. The fillers and oils are mixed into the acid form at temperatures below 150° F. in order to avoid decomposition of the acid form during processing. After sulfonation, isolation, and drying of the polymeric free sulfonic acid said product is converted to an ionomer by reaction with at least about 100% of the stoichiometric proportion of a metallic or nitrogen base, based on the sulfonic acid content of said sulfonated polymer.

Fillers which can be used in the present invention are mineral fillers and carbon blacks. The mineral fillers employed are selected from talcs, ground calcium carbonate, water precipitated calcium carbonate, or delaminated, calcined or hydrated clays and mixtures thereof. Typically, these mineral fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical mineral fillers employed in this invention are illustrated in Table I.

Carbon blacks range widely in physical and chemical properties. Physically they vary in average particle size, particle size distribution, specific surface area, porosity of surface, and the tendency of the individual primary particles to be associated in chain-like structure. Chemically they vary in the population and nature of oxygenated structures combined with their surface. Typical carbon blacks employed by this invention are illustrated in Table II.

These mineral and carbon black fillers are blended into the blend composition at about 5 to about 300 parts per hundred; more preferably at about 20 to about 250; and most preferably at about 25 to about 200.

TABLE I

| Filler | Code # | Oil Absorption grams of oil/ 100 grams of filler | Specific Gravity | Avg. Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil XB | 30 | 2.61 | 4.5 | 6.5–7.5 |
| Hydrated clay | Suprex | | 2.6 | 2 | 4.0 |
| Calcined clay | Icecap K | 50–55 | 2.63 | 1 | 5.0–6.0 |
| Magnesium silicate (talc) | Mistron Vapor | 60–70 | 2.75 | 2 | 9.0–7.5 |

TABLE II

| Carbon Black | Type | Nigrometer Index | Sp. Surface Area, $m^2/g$ | EM Diameter $(d_n)$, A° | Volume, % | pH | Total Acids, meq./g |
|---|---|---|---|---|---|---|---|
| Black Pearls 46 | Channel | 65 | 800 | 130 | 14.0 | 3.0 | 2.42 |
| Black Pearls 74 | Channel | 74 | 332 | 170 | 5.0 | 5.0 | 0.95 |
| Spheron 9 | Channel | 85 | 105 | 290 | 5.0 | 5.0 | 0.94 |
| Vulcan 9 | Oil Furnace (SAF) | 86 | 124 | 200 | 1.5 | 8.5 | 0.84 |
| Vulcan 3 | Oil Furnace (HAF) | 90 | 74 | 290 | 1.0 | 8.5 | 0.68 |
| Regal 330 | Low Structure Oil Furnace | 84.5 | — | 240 | — | 8.5 | 0.42 |
| Sterling S | Gas Furnace | 99 | 23 | 800 | 1.0 | 9.5 | 0.18 |
| Sterling FT | Thermal (FT) | 107 | 13 | 1800 | 0.5 | 8.5 | 0.12 |
| Sterling MT | Thermal (MT) | 110 | 6 | 4700 | 0.5 | 8.5 | 0.10 |

The oils employed in the present invention are nonpolar process oils having less than about 6 wt. % polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 ssu at 100° F. and a number average molecular weight of about 300 to about 1,000, and more preferably about 300 to 750. The preferred process oils are paraffinics. Table III illustrates typical oils encompassed by the scope of this invention.

The oils are incorporated into the blend composition at a concentration level of about 20 to about 200 parts per hundred; more preferably at about 20 to about 175, and most preferably at about 25 to about 150.

TABLE III

| Type Oil | Oil Code # | Viscosity ssu | Mn | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |
| Aromatic | Sundex 790 | 3000 | — | 5.4 | 59.3 | 35.3 |
| Naphthenic | Sunthene 4240 | 2206 | — | 1.1 | 43.9 | 55.0 |

Various other additives can be incorporated into the blend composition to improve the physical properties, the appearance, the chemical properties of the formed elastomeric article or to modify the processability of the blend compositions.

A crystalline polyolefinic thermoplastic can be incorporated into the blend composition in minor proportions as a means for modification of the rheological properties of the blend compositions as well as the stiffness of the elastomeric article. Typically, the crystalline polyolefinic thermoplastic is added to the blend composition at a concentration level of about 0 to about 100 parts per hundred by weight based on 100 parts of sulfonated polymer, more preferably at about 0 to about 75; and most preferably at about 0 to about 50.

A lubricant can be employed in the blend composition at a concentration level of less than about 20 parts per hundred based on 100 parts of the neutralized sulfonated elastomeric polymers, and more preferably less than about 15. The lubricants of the present instant invention are non-polar paraffinic hydrocarbon waxes having a softening point of about 125° F. to about 220° F., more preferably 150° F. to 200° F., wherein the wax has a number average molecular weight of about 300 to about 4000, more preferably 300 to 3000 and less than about 2 wt. % polar constituents. These lubricants modify the rheological properties of the composition, improve the processability in forming the elastomeric article and impart a shine or gloss to the elastomeric article. Additionally, amorphous polypropylene can be used as a lubricant.

Additionally, mineral reinforcing fillers can be added as additives to the blends of sulfonated polymer, filler and oil, wherein the reinforcing filler is selected from the group consisting essentially of silica, or calcium silicate and mixtures thereof. These reinforcing agents are generally characterized as having particle sizes below 0.1 microns and oil absorption above about 100. These reinforcing fillers are incorporated in the blend composition at about 0 to 50 parts per hundred based on 100 parts of sulfonated polymer, more preferably 0 to 25.

The ingredients incorporated into the blend compositions of the present invention, in conjunction with the type of elastomeric polymer, the degree of sulfonation, and the metal counterion of the neutralized sulfonated elastomeric polymer give materials processable by extrusion or injection molding processes into elastomeric articles having the desirable physical and rheological properties. These combined physical properties and rheological processability characteristics were not previously obtainable in the aforementioned U.S. patents.

Conversion of the uncompounded or compounded polymeric sulfonic acid by means of a metallic base or carboxylate occurs readily even at room temperature although higher temperatures, for example 75° C. to 200° C., most preferably 100° C. to 150° C. and high shear mixing may be required to get complete neutralization. Sufficient mixing and heat are normally obtained under conventional mixing conditions with equipment such as rubber mills, Banbury mixers, and extruders. The resultant neutralized compounds have excellent processability for extrusion, injection molding, vacuum forming, compression molding and similar operations.

A means of characterizing the apparent molecular weight of a polymer involves the use of melt rheological measurements. For ionic polymers, this is the preferred method since solution techniques are difficult to interpret due to the complex nature of the ionic associations. Melt rheological measurements of apparent viscosity at a controlled temperature and shear rate can be used as a measure of apparent molecular weight of an ionic polymer. Although the exact relationship between melt viscosity and apparent molecular weight for these ionic systems is not known, for the purposes of this application the relationship will be assumed to be one of direct proportionality. Thus, in comparing two materials, the one with the higher melt viscosity will be associated with the higher apparent molecular weight.

The melt viscosity of the systems investigated were determined by the use of an Instron Capillary Rheometer. Generally, the melt viscosity measurements were made at a temperature of 200° C. and at various shear rates corresponding to crosshead speeds from 0.005 in/min to 20 in/min. The apparent viscosity of 200° C. and at a shear rate of 0.73 sec$^{-1}$ (0.005 in/min) will be employed as a characterization parameter in this application. A measure of the melt elasticity of a given system can also be obtained from these rheological measurements. A type of flow instability known as melt fracture is exhibited by many polymeric materials of high molecular weight. This phenomenon is shear sensitive and thus will generally exhibit itself at a given shear rate and temperature. The shear rate for the onset of melt fracture indicates the upper shear rate for processing a given material.

DETAILED DESCRIPTION

The advantages of the improved process of manufacturing these new compositions of sulfonated elastomeric products may be more readily appreciated by reference to the following examples.

EXAMPLE 1

A commercial EPDM rubber, Vistalon 2504, which is a terpolymer of ethylene, propylene and 5-ethylidene-2-norbornene having an $\overline{M}n$ of about 46,700, an $\overline{M}v$ of about 145,000 and a Mooney viscosity (ML, 1+8, 212° F.) of about 40, was sulfonated according to the following procedure. 500 grams of Vistalon 2504 was dissolved in 5.0 liters of hexane and 28.7 ml of acetic anhydride to form a cement. Concentrated sulfuric acid (10.52 ml) was dripped slowly into the cement, and the cement was stirred for 30 minutes at room temperature. The reaction was quenched after thirty minutes with 200 ml of isopropanol containing 2.5 grams of Antioxidant 2246 [2,2'-methylene-bis-(4-methyl-6-tert butyl-phenol)]. The cement was steam stripped then to isolate the acid form of the sulfonated elastomeric polymer, and the acid form was then washed with water in a Waring blender. The resultant crumb was dewatered to less than 10 wt. % water on a two-roll rubber mill at about 110° F. It contained 0.98 wt. % sulfur.

Samples of the acid form of the sulfonated EPDM polymer were placed in vacuum ovens at 80° C. and 100° C. and analyzed after 24 and 72 hours with the results shown in Table IV.

TABLE IV

| | Sulfur Content, wt. % Based on Sulfonated EPDM Rubber |
|---|---|
| At 176° F. | |
| 24 hours | 1.00 |
| 72 hours | 0.92 |
| At 212° F. | |
| 24 hours | 0.78 |
| 72 hours | 0.64 |

This example shows that the acid form of a sulfonated EPDM polymer is thermally labile and that care must be exercised in its handling. However, these results show that little degradation occurs at about 176° F.

Consequently little degradation, and therefore no deleterious effects, are encountered when the polymeric sulfonic acid is processed for relatively short periods of time at below about 150° F.

EXAMPLE 2

To a solution of 200 grams of Vistalon 2504 in 4 liters of chlorobenzene was added 50 ml. of 1.0 molar acetyl sulfate in chlorobenzene. The acetyl sulfate was prepared by mixing 4.0 moles of acetic anhydride with 1.0 mole of concentrated sulfuric acid at below 10° C. in 566 ml of chlorobenzene. The cement was stirred for thirty minutes and the reaction was quenched with 100 ml of methanol containing 1.0 gram of Antioxidant 2246. The reaction mixture was steam stripped, the product pulverized with water in a Waring blender, and the resultant wet crumb dewatered on a rubber mill at about 110° F. to form the acid form of the sulfonated EPDM polymer which contained 20.6 meq. of $SO_3H$ groups per 100 grams of the sulfonated EPDM polymer as measured by acid titration.

Samples of the acid form of the sulfonated EPDM terpolymer were mixed on a cold rubber mill at a temperature of less than about 150° F. for a period of time sufficient to form a homogeneous mixture with sodium stearate, zinc stearate, magnesium stearate, calcium stearate, and barium stearate, wherein 11 parts of the metal stearate was used per 100 parts of the sulfonated terpolymer. The formulated gums were compression molded for various times at various temperatures. Excellent flawless micropads were obtained in all cases which exhibited excellent tensile properties as shown in Table V. The control in this Table is the acid form of the sulfonated EPDM polymer.

EXAMPLE 3

To a solution of 400 grams of Vistalon 2504 dissolved in 8000 ml. of chlorobenzene was dripped in 160 ml. of a 1 Molar acetyl sulfate solution prepared according to the process of Example 2. After 30 minutes stirring of the cement at room temperature, the reaction was terminated by the addition of 160 ml. of methanol containing 1.6 grams of Antioxidant 2246. The reaction mixture was steam stripped, the product was pulverized twice in methanol containing Antioxidant 2246 in a Waring blender; the resultant crumb of the acid form of the sulfonated EPDM rubber was dewatered on a two-roll rubber mill until the material was lacy and then the material was washed twice again with stabilized methanol. The crumb was dewatered again and banded on a warm rubber mill at about 140° F. Sulfur analysis showed the acid form of the sulfonated EPDM polymer to contain about 26.6 meq. $SO_3H$ groups per 100 grams of polymer.

A sample of the sulfonated EPDM was mixed on a cold two-roll rubber mill with 16 phr of magnesium stearate. The formulation was then heated at 325° F. for 45 minutes.

Another sample of the acid form of the sulfonated EPDM polymer (40 grams) was dissolved in 760 ml. of toluene and 40 ml. methanol. To the solution was added 23.3 ml. of 1 N magnesium acetate in 50 ml. water/50 ml. methanol. The neutralized product was steam stripped, washed twice with stabilized methanol in a Waring blender, and dried in a vacuum oven.

A compression molded sample of the bulk neutralized magnesium stearate was smooth and shiny. The solution neutralized sample of magnesium acetate could not be

TABLE V

| Metal Stearate | Mold Min/°F. | 300% Modulus, psi | Tensile Strength, psi | Elongation, % | Tensile Set, % | Volume Swell, % |
|---|---|---|---|---|---|---|
| Control | 60/350 | 70 | 210 | 990 | 77 | — |
| Sodium Stearate | 15/285 | 400 | 1540 | 590 | — | — |
|  | 60/350 | 440 | 2770 | 620 | 12.5 | 510 |
|  | 5/400 | 450 | 2640 | 645 | — | — |
| Zinc Stearate | 60/350 | 310 | 1590 | 660 | 18.7 | 690 |
| Magnesium Stearate | 60/350 | 500 | 3200 | 700 | 18.7 | 330 |
| Calcium Stearate | 60/350 | 450 | 2260 | 635 | 12.5 | 470 |
| Barium Stearate | 15/285 | 490 | 1310 | 500 | — | — |
|  | 60/350 | 460 | 1720 | 560 | — | — |
|  | 5/400 | 480 | 1880 | 610 | — | — |

This example clearly demonstrates that the acid form of the sulfonated EPDM polymer can be readily isolated and dewatered. Flawless articles can be prepared through the mixing of the acid form of the sulfonated EPDM polymer on the cold two roll rubber mill with a metallic salt of a carboxylic acid to at least partially neutralize the acid form and subsequently compression molding the product at an elevated temperature thereby causing complete neutralization of the acid form. The particular metallic ion used to neutralize the acid form has a dramatic effect on the tensile properties of the neutralized, ionically cross-linked sulfonated EPDM elastomeric product.

compression molded to a smooth, strain free pad.

The rheologies of these two neutralized samples were measured on an Instron Capillary Rheometer using a 0.05"×1.0" die at 200° C. The shear rate-shear stress and viscosity data of these two samples are summarized in Table VI. A compression molded slab at 325° F. for 45 minutes was prepared for the magnesium stearate sample for testing. The dried crumb of the magnesium acetate was used. The magnesium acetate sample gave rough strands below 15 sec$^{-1}$ and at higher shear rates the strands disintegrated into crumb. This behavior is indicative of a cross-linked elastomer. The magnesium stearate sample showed a dramatic change in the flow and melt structure. Substantially lower viscosities and a delay in melt fracture was obtained with the magnesium stearate sample which indicates an improvement in processability.

TABLE VI

| Shear Rate | 0.74 sec$^{-1}$ | 7.4 sec$^{-1}$ | 74 sec$^{-1}$ | Comments |
|---|---|---|---|---|
| Mg Acetate, Solution | | | | |

TABLE VI-continued

| Shear Rate | 0.74 sec$^{-1}$ | 7.4 sec$^{-1}$ | 74 sec$^{-1}$ | Comments |
|---|---|---|---|---|
| Neutralized | | | | |
| Shear Stress, Dynes/cm$^2$ × 10$^{-5}$ | 50.0 | 67.0 | 75.7 | Strand does not hold |
| Viscosity, poise × 10$^{-5}$ | 67 | 9.0 | 1.0 | at 15 sec$^{-1}$. Severe crumbling at 74 sec$^{-1}$. |
| Mg Stearate, Bulk Neutralized | | | | |
| Shear Stress, Dynes/cm$^2$ × 10$^{-5}$ | 20.1 | 42.6 | 68.6 | Melt fracture at 30 |
| Viscosity, poise × 10$^{-5}$ | 27 | 5.7 | 0.92 | sec$^{-1}$. Maintains strand integrity beyond 300 sec$^{-1}$. |

EXAMPLE 4

A sulfonated EPDM polymer of Vistalon 2504 was prepared according to the procedure of Examples 2 and 3. The sulfonated EPDM polymer contained 17.8 meq. of SO$_3$H groups per 100 grams of polymer.

Sample A was prepared by mixing 100 grams of polymer with 11 grams of magnesium stearate on a cold two-roll mill.

Sample B was prepared by mixing 100 grams of polymer with 11 grams of barium stearate on a cold two-roll mill.

Samples C and D were prepared by mixing 100 grams of polymer with 50 grams of HAF carbon black on a cold two-roll mill. After a homogeneous mixture had been obtained, for each sample, 11 grams of either magnesium stearate or barium stearate was added to make respectively Samples C and D. The mixing was continued on the mill to give at least partially neutralized samples of the sulfonated EPDM polymer.

Samples E and F were prepared by mixing 100 grams of the polymer with 75 grams of carbon black SRF, 75 grams of carbon black FEF, and 100 grams of Flexon 845 oil on a cold two-roll mill. After a homogeneous mixture had been obtained for each, 11 grams of either magnesium stearate or barium stearate was added to make respectively Samples E and F. The mixing was continued on the mill to give at least partially neutralized samples of the sulfonated EPDM polymer. The six samples (A–F) were compression molded at 325° F. for 45 minutes. The resultant samples were smooth and shiny. The tensile properties of these neutralized samples are summarized in Table VII and the rheological properties of the six samples are summarized in Table VIII. Excellent physical and rheological properties are obtained even with highly filled systems.

TABLE VII

| | | | At Room Temperature | | | At 100° C. | | |
|---|---|---|---|---|---|---|---|---|
| Sample | Formulation | Metal Stearate | 300 Modulus, psi | Tensile Strength, psi | Elong., % | 300 Modulus, psi | Tensile Strength, psi | Elong., % |
| A | Gum | Magnesium | 370 | 3010 | 600 | 140 | 270 | 745 |
| B | Gum | Barium | 410 | 2340 | 610 | 120 | 160 | 630 |
| C | Black | Magnesium | 1450 | 2600 | 560 | 500 | 600 | 445 |
| D | Black | Barium | 1460 | 2380 | 510 | 475 | 550 | 390 |
| E | Oil-Black | Magnesium | 355 | 340 | 290 | — | 100 | 140 |
| F | Oil-Black | Barium | 610 | 720 | 420 | — | 210 | 270 |

TABLE VIII

| Sample | Metal Ion | Shear Rate, Sec$^{-1}$ | Shear Stress Dynes/cm$^2$ × 10$^{-5}$ | Viscosity, Poise | Shear Rate At Fracture |
|---|---|---|---|---|---|
| A | Mg | 0.74 | 17.7 | 2.4 × 10$^6$ | 7.4 sec$^{-1}$ |
| | | 7.4 | 43.0 | 5.8 × 10$^5$ | |
| | | 74 | 62.3 | 8.4 × 10$^4$ | |
| B | Ba | 0.74 | 32.8 | 4.4 × 10$^6$ | 0.74 sec$^{-1}$ |
| | | 7.4 | 54.2 | 7.3 × 10$^5$ | |
| | | 74 | 73.3 | 9.9 × 10$^4$ | |
| C | Mg | 0.74 | 26.2 | 3.5 × 10$^6$ | 74 sec$^{-1}$ |
| | | 7.4 | 50.5 | 6.8 × 10$^5$ | |
| | | 74 | 70.2 | 9.4 × 10$^4$ | |
| D | Ba | 0.74 | 35.1 | 4.7 × 10$^6$ | 30 sec$^{-1}$ |
| | | 7.4 | 59.4 | 8.0 × 10$^5$ | |
| | | 74 | — | — | |
| E | Mg | 0.74 | 6.0 | 8.1 × 10$^5$ | 740 sec$^{-1}$ |
| | | 7.4 | 10.9 | 1.5 × 10$^5$ | |
| | | 74 | 20.5 | 2.8 × 10$^4$ | |
| | | 740 | 40.2 | 5.4 × 10$^3$ | |
| F | Ba | 0.74 | 6.9 | 9.2 × 10$^5$ | 149 sec$^{-1}$ |
| | | 7.4 | 14.1 | 1.9 × 10$^5$ | |
| | | 74 | 25.1 | 3.4 × 10$^4$ | |
| | | 740 | 50.1 | 6.7 × 10$^3$ | |

EXAMPLE 5

A sample of sulfonated Vistalon 2504 was prepared according to the procedure of Examples 2 and 3. The acid form of the sulfonated EPDM polymer contained about 22.8 meq. SO$_3$H groups per 100 grams of the polymer.

Samples of these materials were formulated according to the gum, black, and oil-black formulations as described in Example 4 except that 13 grams of magnesium stearate and barium stearate were used per 100 grams of polymer. The samples were compression molded at 325° F. for 45 minutes. All the compression molded pads were smooth and shiny. The tensile properties of the molded samples are given in Table IX and the rheological properties are summarized in Table X.

This example and Example 4 shows the rheological behavior of the neutralized sulfonated EPDM elastomeric polymers varies as a function of the sulfonate content, metal counterion and formulation.

TABLE IX

| Metal Stearate | Formulation | At Room Temperature | | | At 100° C. | | |
|---|---|---|---|---|---|---|---|
| | | 300% Modulus, psi | Tensile Strength, psi | Elong., % | 300% Modulus, psi | Tensile Strength, psi | Elong., % |
| Magnesium | Gum | 520 | 4680 | 620 | 200 | 440 | 700 |
| Barium | Gum | 610 | 3135 | 550 | 180 | 270 | 570 |
| Magnesium | Black | 1820 | 3060 | 530 | 550 | 800 | 520 |
| Barium | Black | 1890 | 2861 | 490 | 630 | 845 | 450 |
| Magnesium | Oil-Black | 760 | 922 | 440 | 260 | 260 | 330 |
| Barium | Oil-Black | 780 | 924 | 375 | 240 | 270 | 380 |

TABLE X

| Metal | Formulation | Shear Rate, Sec$^{-1}$ | Shear Stress Dynes/cm$^2$ × 10$^{-5}$ | Viscosity Poise | Shear Rate At Fracture |
|---|---|---|---|---|---|
| Mg | Gum | 0.74 | 15.1 | 2.0 × 10$^6$ | 30 |
| | | 7.4 | 38.5 | 5.2 × 10$^5$ | |
| | | 74 | 63.9 | 8.6 × 10$^4$ | |
| Ba | Gum | 0.74 | 38.8 | 5.2 × 10$^6$ | 0.3 |
| | | 7.4 | 56.9 | 7.7 × 10$^5$ | |
| | | 74 | 69.0 | 9.3 × 10$^4$ | |
| Mg | Black | 0.74 | 20.6 | 2.8 × 10$^6$ | 30 |
| | | 7.4 | 47.7 | 6.4 × 10$^5$ | |
| | | 74 | 71.7 | 9.7 × 10$^4$ | |
| Ba | Black | 0.74 | 48.9 | 6.6 × 10$^6$ | 7.4 |
| | | 7.4 | 72.6 | 9.8 × 10$^5$ | |
| | | 74 | — | — | |
| Mg | Oil-Black | 0.74 | 6.3 | 8.5 × 10$^5$ | 1500 |
| | | 7.4 | 11.8 | 1.6 × 10$^5$ | |
| | | 74 | 20.7 | 2.8 × 10$^4$ | |
| Ba | Oil-Black | 0.74 | 8.8 | 1.2 × 10$^6$ | 74 |
| | | 7.4 | 15.0 | 2.0 × 10$^5$ | |
| | | 74 | 27.2 | 3.7 × 10$^4$ | |

EXAMPLE 6

A sample of sulfonated Vistalon 2504 was prepared according to the procedure of Examples 2 and 3. The acid form of the sulfonated EPDM polymer contained about 29.7 meq. SO$_3$H groups per 100 grams of polymer.

Samples were prepared according to the following formula:
Sulfonated EPDM polymer: 100 grams
Metal Stearate: 16 grams
for the following metallic stearates: lithium, sodium, magnesium, zinc, lead, barium, and calcium. Compression molded pads were made for each sample at 325° F. for 15 minutes, wherein each sample was smooth and shiny. The tensile and volume swell properties for these samples are summarized in Table XI. The data show that outstanding gum physical properties can be obtained by bulk neutralization and that the rheological and physical properties are a function of the metal counterion.

TABLE XI

| | GUM FORMULATION. TESTED AT ROOM TEMPERATURE. | | | |
|---|---|---|---|---|
| Metal Stearate | 300% Modulus, psi | Tensile Strength, psi | Elongation, % | Volume Swell, % |
| Li | 380 | 2120 | 590 | 340 |
| Na | 590 | 4280 | 620 | 310 |
| Mg | 550 | 3930 | 600 | 230 |
| Zn | 410 | 3270 | 630 | 340 |
| Pb | 580 | 3710 | 590 | 330 |
| Ba | 700 | 3320 | 540 | 250 |
| Ca | 550 | 4290 | 570 | 270 |

EXAMPLE 7

A sample of sulfonated Vistalon 2504 was prepared according to the procedure of Examples 2 and 3. The acid form of the sulfonated EPDM terpolymer had about 15.3 meq. SO$_3$H groups per 100 grams of polymer.

The acid form of the sulfonated EPDM polymer was mixed on a two roll rubber mill with the following metal stearates: magnesium, barium, calcium, sodium, lead, aluminum, iron, and zinc. The amount of each stearate used is illustrated in Table XII with the resultant tensile properties for a compression molded pad for each sample at 325° F. for 45 minutes. Each pad was smooth and shiny. The data show clearly that very good physical properties are obtainable for gums at low levels of sulfonate. The rheological properties are summarized in Table XIII which shows that flow can be made to vary with the metal counter-ion.

TABLE XII

| Metal Stearate | Parts Per 100 of Polymer | 300% Modulus, psi | Tensile Strength, psi | Elongation, % |
|---|---|---|---|---|
| Mg | 11 | 470 | 2260 | 630 |
| Ba | 13.3 | 440 | 1570 | 550 |
| Ca | 11.4 | 310 | 1450 | 605 |
| Na | 11.5 | 390 | 1390 | 560 |
| Pb | 14.6 | 290 | 1410 | 550 |
| Al | 1.3 | 310 | 905 | 550 |
| Fe | 1.3 | — | 820 | 610 |
| Zn | 12 | 320 | 970 | 540 |

TABLE XIII

| Metal Stearate | Parts Per 100 of Polymer | Shear Stress, Dynes/cm² × 10⁻⁵ 0.74 sec⁻¹ | 147 sec⁻¹ | 740 sec⁻¹ | Melt Fracture sec⁻¹ |
|---|---|---|---|---|---|
| Zn | 12 | 3.19 | 39.0 | 63.5 | ≦295 |
| Pb | 14.6 | 6.62 | 49.9 | 77.1 | 295 |
| Fe | 11.3 | 6.62 | 51.8 | 72.8 | 74 |
| Mg | 11 | 13.47 | 66.6 | 89.6 | 29 |
| Al | 11.3 | 14.80 | 65.8 | 91.9 | 14.7 |
| Na | 11.5 | 16.52 | 67.4 | 91.9 | 74 |
| Ca | 11.4 | 21.58 | 69.3 | 94.3 | 14.7 |
| Ba | 13.3 | 24.70 | 74.0 | 95.8 | 14.7 |

EXAMPLE 8

The sulfonated polymer of Example 6 was compounded on a cold two roll mill according to the following formulation:

| | Grams |
|---|---|
| Sulfonated EPDM polymer | 100 |
| SRF Carbon Black | 75 |
| FEF Carbon Black | 75 |
| Flexon 845 Oil | 100 |
| Metal Stearate | 16 | wherein a sample was prepared from magnesium stearate and another sample was prepared from barium stearate. In each case, the metal stearate was added after a homogeneous mixture of the sulfonated polymer, carbon blacks, and oil had been achieved. The samples were compression molded into pads at 325° F. for 45 minutes and the resultant pads for the two samples were smooth and shiny. The tensile properties of the samples are summarized in Table XIV and the rheological properties are summarized in Table XV. These samples clearly illustrate that extended products can have excellent room temperature properties, as well as good 100° C. tensile properties while still possessing excellent rheological properties for extrusion or injection molding.

TABLE XIV

| Metal Stearate | Room Temperature | | | 100° C. | | |
|---|---|---|---|---|---|---|
| | 300% Modulus, psi | Tensile Strength, psi | Elongation, % | 300% Modulus, psi | Tensile Strength, psi | Elongation, % |
| Mg | 855 | 1100 | 420 | 365 | 360 | 340 |
| Ba | 820 | 1080 | 440 | 320 | 350 | 360 |

TABLE XV

| Metal Stearate | Shear Rate, sec⁻¹ | Shear Stress Dynes/cm² × 10⁻⁵ | Viscosity, Poise | Shear Rate At Fracture |
|---|---|---|---|---|
| Mg | 0.74 | 6.3 | 8.5 × 10⁵ | 1500 sec⁻¹ |
| | 7.4 | 12.2 | 1.6 × 10⁵ | |
| | 74 | 21.1 | 2.8 × 10⁴ | |
| | 740 | 41.0 | 5.5 × 10³ | |
| Ba | 0.74 | 9.9 | 1.3 × 10⁶ | 150 sec⁻¹ |
| | 7.4 | 17.1 | 7.0 × 10⁵ | |
| | 74 | 29.2 | 3.9 × 10⁴ | |
| | 740 | 68.2 | 9.2 × 10³ | |

EXAMPLE 9

Neat acetyl sulfate was prepared as follows: 164.8 grams (1.61 moles) of acetic anhydride was cooled to −30° C. and 97.9 grams (1.0 mole) of concentrated sulfuric acid was added slowly so that the temperature did not exceed 0° C. After all the sulfuric acid was added, the thick mixture was warmed at 10° C. and then used for sulfonation. The neat acetyl sulfate is 4.84 Molar.

Five hundred grams of Vistalon 2504 was dissolved in 10 liters of heptane and 52 ml of the 4.84 Molar acetyl sulfate was added at room temperature. After 60 minutes of stirring, the reaction was terminated with 200 ml of stabilized methanol. The acid form of the sulfonated EPDM was recovered by steam stripping, and the elastomeric mass was pulverized in a Waring blender with stabilized methanol. The sulfonated polymer was dewatered on a rubber mill at 104° F., and when the mass had fused and banded, it was kept on the mill for two more minutes. Titration of the sulfonated polymer showed it contained about 37.4 meq. SO₃H groups per 100 grams of polymer. A second sample prepared had about 39.4 meq. SO₃H groups per 100 grams of polymer. A blend of the two preparations, used in the following formulas, had 36.4 meq. SO₃H groups per 100 grams of polymer.

The following formulations were prepared on a two roll mill from the acid form of the sulfonated EPDM polymer.

| (A) | Polymer | 100 parts |
|---|---|---|
| | Metal Stearate | 2 equivalents/mole SO₃H |
| (B) | Polymer | 100 parts |
| | Metal Stearate | 3 equivalents/mole SO₃H |
| (C) | Polymer | 100 parts |
| | SRF Black | 75 parts |
| | FEF Black | 75 parts |
| | Flexon 845 Oil | 100 parts |
| | Metal Stearate | 2 equivalents/mole SO₃H |
| (D) | Polymer | 100 parts |
| | SRF Black | 75 parts |
| | FEF Black | 75 parts |
| | Flexon 845 Oil | 100 parts |
| | Metal Stearate | 3 equivalents/mole SO₃H |

Each of the formulations were made with the sodium and magnesium salts of octanoic, decanoic, lauric, myristic, palmitic, and stearic acids. In the oil-black formulations, the oil and carbon black were well dispersed prior to the addition of the metal carboxylate.

shear rates which is desirable for an extrusion process or a high speed injection molding operation.

TABLE XVI

ROOM TEMPERATURE PHYSICAL PROPERTIES
(TENSILE STRENGTH, PSI/ELONGATION, %)
OF SULFO-EPDM BULK NEUTRALIZED WITH THE SODIUM AND MAGNESIUM SALTS
OF VARIOUS FATTY ACIDS

| OIL-BLACK | Sodium Salts | Stearate | Palmitate | Myristate | Laurate | Decanoate | Octanoate |
|---|---|---|---|---|---|---|---|
| | 2 Equivalents | 1010/330 | 1050/340 | 930/305 | 880/345 | 800/325 | 730/350 |
| | 3 Equivalents | 990/310 | 1050/300 | 840/210 | 930/250 | 775/280 | 830/240 |
| | Magnesium Salts | | | | | | |
| | 2 Equivalents | 1010/320 | 1070/390 | 805/310 | 870/395 | 880/360 | — |
| | 3 Equivalents | 1060/430 | 1035/430 | 890/450 | 870/420 | 840/430 | — |
| GUM | Sodium Salts | | | | | | |
| | 2 Equivalents | 4330/555 | 4150/525 | 3555/510 | 2500/475 | 1740/450 | 1940/460 |
| | 3 Equivalents | 3870/550 | 3820/560 | 1880/470 | 535/190 | 2280/480 | 2170/480 |
| | Magnesium Salts | | | | | | |
| | 2 Equivalents | 4090/570 | 3920/590 | 2250/510 | 2740/525 | 2090/490 | — |
| | 3 Equivalents | 4660/630 | 3850/630 | 4050/570 | 3165/530 | 3030/525 | — |

TABLE XVII

100° C. PHYSICAL PROPERTIES (TENSILE STRENGTH, PSI/ELONGATION, %)
OF SULFO-EPDM BULK NEUTRALIZED WITH
THE SODIUM AND MAGNESIUM SALTS OF VARIOUS FATTY ACIDS

| OIL-BLACK | Sodium Salts | Stearate | Palmitate | Myristate | Laurate | Decanoate | Octanoate |
|---|---|---|---|---|---|---|---|
| | 2 Equivalents | 50/280 | 80/250 | 90/250 | 280/200 | 280/200 | 200/180 |
| | 3 Equivalents | 110/210 | 180/160 | 170/160 | 420/190 | 250/120 | 240/150 |
| | Magnesium Salts | | | | | | |
| | 2 Equivalents | 170/300 | 430/250 | 250/250 | 390/230 | 480/165 | — |
| | 3 Equivalents | 270/350 | 560/290 | 300/320 | 330/320 | 400/215 | — |
| GUM | Sodium Salts | | | | | | |
| | 2 Equivalents | 420/750 | 540/660 | 480/490 | 770/400 | 410/390 | 320/420 |
| | 3 Equivalents | 630/720 | 730/630 | 340/460 | 410/140 | 400/400 | 410/400 |
| | Magnesium Salts | | | | | | |
| | 2 Equivalents | 220/610 | 590/510 | 500/450 | 330/520 | 425/335 | — |
| | 3 Equivalents | 970/730 | 840/490 | 820/610 | 520/525 | 430/420 | — |

TABLE XVIII

| Metal | Carboxylic Acid | Equivalents/ $SO_3H$ | Shear Stress, Dynes/cm$^2$ × $10^{-5}$ | | | | Melt Fracture, sec$^{-1}$ |
|---|---|---|---|---|---|---|---|
| | | | 0.74 sec$^{-1}$ | 7.4 sec$^{-1}$ | 74 sec$^{-1}$ | 740 sec$^{-1}$ | |
| Na | Stearic | 2 | 2.6 | 6.3 | 12 | 25 | 2940 |
| Na | Palmitic | 2 | 2.4 | — | 12 | 26 | 2940 |
| Na | Myristic | 2 | 2.4 | — | 12 | 25 | 2940 |
| Na | Lauric | 2 | 3.2 | — | 13 | 31 | 2940 |
| Na | Decanoic | 2 | 2.6 | — | 11 | 23 | >2940 |
| Na | Octanoic | 2 | 2.5 | — | 11 | 22 | >2940 |
| Na | Stearic | 3 | 1.6 | — | 9.4 | Pulsates | >2940 |
| Na | Palmitic | 3 | 1.6 | — | 9.6 | Pulsates | >2940 |
| Na | Myristic | 3 | 1.6 | — | 9.2 | Pulsates | >2940 |
| Na | Lauric | 3 | 2.1 | — | 10.6 | Pulsates | >2940 |
| Na | Decanoic | 3 | 1.6 | — | 9.1 | 17.6 | 740 |
| Na | Octanoic | 3 | 1.7 | — | 9.1 | Pulsates | >2940 |
| Mg | Stearic | 2 | 2.4 | — | 11 | 24 | 2940 |
| Mg | Palmitic | 2 | 3.3 | — | 12 | 33 | 2940 |
| Mg | Myristic | 2 | 2.8 | — | 11 | 26 | 2940 |
| Mg | Lauric | 2 | 2.7 | — | 11 | 24 | 2940 |
| Mg | Decanoic | 2 | 2.8 | — | 11 | 24 | 2940 |
| Mg | Stearic | 3 | 1.9 | — | 9.8 | Pulsates | >2940 |
| Mg | Palmitic | 3 | 1.9 | — | 9.1 | Pulsates | >2940 |
| Mg | Myristic | 3 | 1.9 | — | 9.2 | Pulsates | >2940 |
| Mg | Lauric | 3 | 2.0 | — | 10.0 | Pulsates | >2940 |
| Mg | Decanoic | 3 | 2.2 | — | 10.5 | Pulsates | >2940 |

Test plaques were compression molded at 325° F. for 45 minutes, and all the plaques were smooth and shiny. Table XVI shows the tensile properties of these samples at room temperature while Table XVII shows their tensile properties at 100° F. The data clearly shows that a plurality of metal salts of carboxylic acids can be used in bulk neutralization. Table XVIII summarizes the rheological properties of the oil-black samples, wherein these formulations possess very low viscosities at low

EXAMPLE 10

Two hundred grams of a higher molecular weight EPDM elastomer (Vistalon 3708) having a Mooney viscosity (ML, 1+8, 260° F.) of about 45–55, an $\overline{M}n$ of about 52,300, and an $\overline{M}v$ of about 270,000, was dissolved in 5000 ml of hot chlorobenzene, and the temperature was maintained at 50° C. To the resultant cement was added 50 ml of 0.996 M acetyl sulfate in chlorobenzene and the reaction was maintained at 50° C. for 30 minutes. The reaction was quenched with 100 ml of stabilized methanol. The sulfonated EPDM was steam stripped, washed twice with methanol in a Waring blender, and dewatered at 110° F. on a two roll rubber mill until the crumb formed a lace. The lace was washed twice again with stabilized methanol, dewatered again, dried and stabilized with 1.0 grams of Antioxidant 2246 on the two roll mill at 110° F. The resultant acid form of the sulfonated EPDM elastomeric polymer had 21.3 meq. $SO_3H$ groups per 100 grams of polymer.

The following formulations were mixed on a cold two roll rubber mill, wherein the magnesium stearate was added after a homogeneous mixture of the acid form of the sulfonated EPDM, oil and black had been achieved.

| (1) | Sulfonated EPDM | 100 grams |
|---|---|---|
|  | Magnesium Stearate | 16 grams |
| (2) | Sulfonated EPDM | 100 grams |
|  | FEF Black | 50 grams |
|  | Magnesium Stearate | 16 grams |
| (3) | Sulfonated EPDM | 100 grams |
|  | FEF Black | 75 grams |
|  | SRF Black | 75 grams |
|  | Flexon 845 Oil | 100 grams |
|  | Magnesium Stearate | 16 grams |

Test samples were prepared by compression molding at 325° F. for 45 minutes. The tensile properties of these samples are summarized in Table XIX and the rheological properties are shown in Table XX. The neutralized magnesium gums possess an exceptionally high viscosity. Mixing of such high viscosity gums with extender oils and fillers is extremely difficult and dispersion is poor due to the limited wetability of the filler by the polymeric matrix during mixing. Therefore, it is possible to produce a final formulation of superior physical and rheological properties which would have been impossible, if the oil and filler had been mixed directly into the neutralized sulfonated EPDM instead of premixing the fillers and oils into the acid form of the sulfonated EPDM and then neutralizing. The neutralized gums are so intractible that mixing fillers and extenders therein is not possible or practical.

TABLE XIX

| Polymer | Example 10 | | | Example 11 | | |
|---|---|---|---|---|---|---|
| Formulation | 1 | 2 | 3 | 1 | 2 | 3 |
| Room Temperature |  |  |  |  |  |  |
| 300% Modulus, psi | 750 | 1940 | 840 | — | — | — |
| Tensile Strength, psi | 3785 | 2840 | 1050 | — | — | — |
| Elongation, % | 570 | 430 | 430 | — | — | — |
| Tensile Set, % | 56 | 50 | 31 | — | — | — |
| 100° C. |  |  |  |  |  |  |
| 300% Modulus, psi | — | — | — | — | — | — |
| Tensile Strength, psi | 200 | 580 | 200 | 430 | 910 | 450 |
| Elongation, % | 420 | 300 | 270 | 150 | 190 | 280 |
| Tensile Set, % | 42 | 12.4 | 18.6 | 6.2 | 6.2 | 12.4 |

TABLE XX

| Example | Formulation | Shear Rate $sec^{-1}$ | Shear Stress Dynes/cm$^2$ × 10$^5$ | Viscosity, Poise |
|---|---|---|---|---|
| 10 | 1 | 0.74 | 32.3 | 4.4 × 10$^6$ |
|  |  | 7.4 | 54.9 | 7.5 × 10$^5$ |
|  |  | 74 | 69.7 | 9.5 × 10$^4$ |
| 10 | 3 | 0.74 | 9.0 | 1.2 × 10$^6$ |
|  |  | 7.4 | 15.3 | 2.1 × 10$^5$ |
|  |  | 74 | 24.5 | 3.3 × 10$^4$ |
|  |  | 740 | 43.2 | 5.9 × 10$^3$ |
| 11 | 1 | 0.74 | 47.1 | 6.4 × 10$^6$ |
|  |  | 7.4 | 66.6 | 9.0 × 10$^5$ |
|  |  | 74 | 76.0 | 1.0 × 10$^5$ |
| 11 | 3 | 0.74 | 14.5 | 2.0 × 10$^6$ |
|  |  | 7.4 | 21.0 | 2.9 × 10$^5$ |
|  |  | 74 | 30.9 | 4.2 × 10$^4$ |
|  |  | 740 | 54.9 | 7.5 × 10$^3$ |

EXAMPLE 11

A sulfonated EPDM of Vistalon V-3708 was made according to the procedure of Example 10, wherein the resultant acid form of the sulfonated EPDM had 29.2 meq. $SO_3H$ groups per 100 grams of polymer. This polymer was mixed according to the formulations of Example 10 and test samples were prepared by compression molding at 325° F. for 45 minutes. The tensile data are again given in Table XIX, and the rheological properties are summarized in Table XX. The increased sulfonation of the EPDM should decrease the rheological properties; however, superior materials can be still produced by first mixing the fillers and extender oils into the polymeric acid and then bulk neutralizing the homogeneous mixture with metal salt of a carboxylic acid.

EXAMPLE 12

Two hundred grams of Vistalon 2504 was dissolved in 4000 ml of hexane. To the resultant cement was added 11.47 ml. of acetic anhydride, and then 4.2 ml of concentrated sulfuric acid was dripped in at room temperature. The reaction was stirred for thirty minutes at room temperature and the sulfonation was quenched with 100 ml of stabilized methanol. The acid form of the sulfonated EPDM was isolated by steam stripping, washed with water in a Waring blender, dewatered, and dried on a two roll mill at 110° F. The following formulations were made from the acid form of the sulfonated EPDM, wherein the metal salt of the carboxylic acid was added after a homogeneous mixture of the acid form, filler and oil had been achieved.

| (1) | Sulfonated EPDM | 100 grams |
|---|---|---|
|  | Magnesium Stearate | 23.5 grams |
| (2) | Sulfonated EPDM | 100 grams |
|  | Magnesium Acetate . 4H$_2$O | 8.5 grams |
| (3) | Sulfonated EPDM | 100 grams |
|  | FEF Black | 75 grams |
|  | SRF Black | 75 grams |
|  | Flexon 845 Oil | 100 grams |
|  | Magnesium Stearate | 23 grams |
| (4) | Sulfonated EPDM | 100 grams |

-continued

| | |
|---|---|
| FEF Black | 75 grams |
| SRF Black | 75 grams |
| Flexon 845 Oil | 100 grams |
| Magnesium Acetate . 4H$_2$O | 8.5 grams |

These formulations were compression molded at 325° F. for 15 minutes. The physical properties are summarized in Table XXI and the rheological properties are shown in Table XXII. A fifth formulation was prepared according to the recipe of formulation 4, wherein the acid form was first neutralized with the magnesium acetate and then the filler and oil were added. The physical and rheological properties of formulation five are also summarized in Tables XXI and XXII. The formulations with magnesium stearate exhibited improved rheological properties as compared to those of magnesium acetate. In attempting to remold the test pads of formulation 2, it was not possible to make good, well-knitted pads. The rheological properties of formulation 5 are inferior to formulation 4. Thus, better rheological properties are achieved by first forming a homogeneous mixture of the acid form, filler, and oil and then bulk neutralizing with the metal salt of the carboxylic acid.

TABLE XXI

| Formulation | 1 | 2 | 3 | 4 | 5 |
|---|---|---|---|---|---|
| Room Temperature | | | | | |
| Tensile Strength, psi | 3130 | 580 | 820 | 730 | 650 |
| Elongation, % | 600 | 270 | 370 | 290 | 260 |
| 100° C. | | | | | |
| Tensile Strength, psi | 240 | 240 | 190 | 240 | — |
| Elongation, % | 490 | 80 | 290 | 80 | — |

TABLE XXII

| Formulation | Shear Rate, sec$^{-1}$ | Shear Stress, Dynes/cm$^2$ × 10$^5$ | Viscosity, Poise | Shear Rate at Fracture sec$^{-1}$ |
|---|---|---|---|---|
| 1 | 0.88 | 16.4 | — | 29 |
| | 8.8 | 38.9 | — | |
| | 88 | 65.5 | — | |
| | 294 | 80.4 | — | |
| 2 | 0.88 | 38.9 | — | 0.9 |
| | 8.8 | 56.6 | — | |
| | 88 | 71.8 | — | |
| | 294 | 84.3 | — | |
| 3 | 0.88 | 4.1 | — | 1469 |
| | 8.8 | 9.2 | — | |
| | 88 | 17.2 | — | |
| | 294 | 26.2 | — | |
| 4 | 0.88 | 7.5 | — | 88 |
| | 8.8 | 13.6 | — | |
| | 88 | 26.1 | — | |
| | 294 | 38.0 | — | |
| 5 | 0.88 | 13.4 | — | 9 |
| | 8.8 | 24.0 | — | |
| | 88 | 41.0 | — | |
| | 294 | 57.7 | — | |

EXAMPLE 12

A Vistalon 2504 was sulfonated according to the procedures of Examples 2 and 3 and worked up as previously described. The acid form of the sulfonated EPDM had 28.8 meq. SO$_3$H groups per 100 grams of polymer.

The following formulation was prepared on a two roll mill, wherein the magnesium oxide was added after a homogeneous mixture of acid form, the blacks and oil had been achieved.

Sulfonated EPDM: 100 grams
FEF Black: 75 grams
SRF Black: 75 grams
Flexon 845 Oil: 100 grams
MgO: 2.5 grams Test specimens were compression molded at 325° F. for 45 minutes. The physical properties are given in Table XXIII and the rheological properties are summarized in Table XXIV. The final molded products had excellent physical properties, but considerably poorer rheological properties than obtainable with bulk neutralization with magnesium stearate. Metallic oxides can be used to bulk neutralize the acid form of the sulfonated elastomeric polymer thereby resulting in a product with excellent physical properties.

EXAMPLE 13

The acid form of the sulfonated EPDM of Example 12 was compounded on a cold two roll rubber mill according to the following formulations wherein the magnesium stearate and the magnesium oxide were added last.

| | | |
|---|---|---|
| (1) | Sulfonated EPDM | 100 grams |
| | Silene D-250 (Silica Filler) | 250 grams |
| | Flexon 580 | 125 grams |
| | Magnesium Stearate | 16 grams |
| 2 | Sulfonated EPDM | 100 grams |
| | Silene D | 250 grams |
| | Flexon 580 | 125 grams |
| | MgO | 10 grams |

Compression molded plaques were prepared at 325° F. for 45 minutes. The physical properties are summarized in Table XXIII and the rheological properties are given in Table XXIV. Samples could not have been prepared unless the filler and oil was first mixed with the acid form of the sulfonated EPDM and then bulk neutralized with the magnesium oxide or magnesium stearate.

TABLE XXIII

| Example | 12 | 13 | 13 |
|---|---|---|---|
| Formulation | | 1 | 2 |
| Room Temperature | | | |
| 300% Modulus, psi | — | — | — |
| Tensile Strength, psi | 1210 | 765 | 960 |
| Elongation, % | 290 | 230 | 200 |
| Tensile Set, % | 21 | — | — |
| 100° C. | | | |
| 300% Modulus, psi | — | — | — |
| Tensile Strength, psi | 570 | 400 | 530 |
| Elongation, % | 130 | 200 | 112 |
| Tensile Set, % | — | — | — |

TABLE XXIV

| Example | Formulation | Shear Rate, sec$^{-1}$ | Shear Stress, Dynes/cm$^2$ × 10$^5$ | Viscosity, Poise |
|---|---|---|---|---|
| 12 | | 0.74 | 12.4 | 1.68 × 10$^6$ |
| | | 7.4 | 20.1 | 2.7 × 10$^5$ |
| | | 74 | 36.3 | 4.88 × 10$^4$ |
| | | 740 | — | — |
| 13 | 1 | 0.30 | 8.2 | 2.8 × 10$^5$ |
| | | 0.74 | — | — |
| | | 7.4 | — | — |
| | | 14.9 | 19.1 | 1.3 × 10$^5$ |
| | | 74 | 31.5 | 4.2 × 10$^4$ |
| | | 740 | 78.1 | 1.1 × 10$^4$ |
| 13 | 2 | 0.30 | 19.7 | 6.6 × 10$^6$ |

TABLE XXIV-continued

| Example | Formulation | Shear Rate, sec$^{-1}$ | Shear Stress, Dynes/cm$^2$ × 10$^5$ | Viscosity, Poise |
|---------|-------------|------------------------|-------------------------------------|------------------|
|         |             | 0.74                   | 22.6                                | 3.0 × 10$^6$     |
|         |             | 7.4                    | 35.1                                | 4.7 × 10$^5$     |
|         |             | 14.9                   | 38.6                                | 2.6 × 10$^5$     |
|         |             | 74                     | 52.0                                | 7.0 × 10$^4$     |
|         |             | 740                    | —                                   | —                |

EXAMPLE 14

A commercial EPDM, Vistalon 6505, was reduced in molecular weight through a controlled extrusion process. The final Mooney viscosity (ML; 1+8, 212° F.) was about 20. Five hundred grams of this polymer was dissolved in 5000 ml of hexane. To the cement was added 405 mmoles of acetic anhydride followed by 250 mmoles of concentrated sulfuric acid. After stirring for 30 minutes at room temperature sulfonation was terminated through the addition of 750 ml methanol. Antioxidant 2246 (2.5 g) was added to the terminated cement, and the sulfonated polymer was isolated through steam stripping, washing with water in a Waring blender, and then dewatering the wet crumb on a rubber mill at about 110° F. The polymeric free acid contained 20.3 meq. free sulfonic acid/100 polymer according to sulfur analysis. The polymeric sulfonic acid was mixed according to the formulations in Table XXV. In every case the neutralizing agent was added last. Tensile test pads and samples for melt index measurement were molded 15 minutes at 350° F.

The room temperature tensile properties and the melt index at 190° C. and 250 psi are given in Table XXV.

This example demonstrates the use of a high unsaturation EPDM, three different carbon blacks, three different oils, three different metal stearates, at filler loadings of up to 200 parts, and at oil loadings of up to 75 parts.

TABLE XXV

| Sulfonated V-6505 | 100 | 100 | 100 | 100 |
|---|---|---|---|---|
| Thermex (MT Black) | 200 | — | — | — |
| P-33 (FT Black) | — | — | 150 | — |
| Spheron 9 (EPC Black) | — | — | — | 100 |
| Sunpar 2280 | — | 50 | — | — |
| Sundex 790 | — | — | 50 | — |
| Sunthene 4240 | — | — | — | 75 |
| Zinc Stearate | 28.5 | 19 | — | — |
| Lead Stearate | — | — | 35 | — |
| Barium Stearate | — | — | — | 31.7 |

TABLE XXV-continued

| Tensile Strength, psi | 560 | 50 | 300 | 220 |
|---|---|---|---|---|
| Elongation, % | 70 | 420 | 380 | 290 |
| Melt Index (190° C., 250 psi), g/10 minutes | 5.9 | 1.6* | >50 | 0.8 |

*At 6.5 psi

EXAMPLE 15

Five hundred grams of Butyl 365, which contains about 2.0 mole % unsaturation and has a Mooney viscosity (ML, 1+8, 212° F.) of about 45, was dissolved in 5000 ml of hexane. To the cement was added 304 mmoles of acetic anhydride followed by 187.5 mmoles of concentrated sulfuric acid. After 30 minutes agitation at room temperature sulfonation was terminated with 200 ml methanol. Antioxidant 2246 (2.5 g) was added and the sulfonated polymer was isolated and dewatered as described in Example 14. The polymeric sulfonic acid contained 30.9 meq. of free sulfonic acid/100 polymer according to sulfur analysis. Mixtures of this polymeric sulfonic acid were made according to the formulations in Table XXVI. In every case the neutralizing agent was added last. Tensile test pads and samples for melt index were molded 15 minutes at 350° F. The room temperature tensile properties and the melt index at 190° F. and 250 psi are given in Table XXVI.

This example demonstrates the use of a Butyl rubber, three different carbon blacks, three mineral fillers, three different oils, four different metal stearates, and zinc oxide neutralizing agent.

TABLE XXVI

| Sulfonated Butyl 365 | 100 | 100 | 100 | 100 | 100 | 100 | 100 |
|---|---|---|---|---|---|---|---|
| Spheron 9 (EPC Black) | 50 | — | — | — | — | — | — |
| Philblack A (FEF Black) | — | 50 | — | — | — | — | — |
| Philblack E (SAF Black) | — | — | 50 | — | — | — | — |
| Purecal U | — | — | — | — | 100 | — | — |
| Icecap K | — | — | — | — | — | 100 | — |
| Silene D | — | — | — | — | — | — | 100 |
| Sunpar 2280 | — | — | — | — | 50 | — | — |
| Sundex 790 | — | — | — | — | — | 50 | 50 |
| Sunthene 4240 | 27.6 | — | — | — | — | — | — |
| Sodium Stearate | — | 27.3 | — | — | — | — | — |
| Calcium Stearate | — | — | 26.6 | — | — | 26.6 | — |
| Magnesium Stearate | — | — | — | 50 | 28.5 | — | — |
| Zinc Stearate | — | — | — | — | — | — | — |
| Zinc Oxide | — | — | — | — | — | — | 6 |
| Tensile Strength, psi. | 1420 | 1410 | 1705 | 1930 | 890 | 590 | 820 |
| Elongation, % | 710 | 670 | 520 | >1000 | 810 | 800 | 393 |
| Melt Index (190° C., 250 psi), g/10 minutes | 10.7 | 1.9 | 0.1 | 0.2* | 0.1* | 10.9 | 0 |

*At 6.5 psi.

EXAMPLE 16

Commercial Vistalon 2504 was reduced in molecular weight through a controlled extrusion process. The final Mooney viscosity (ML, 1+8, 212° F.) was about 20. Five hundred grams of this polymer was dissolved in 5000 ml of hexane, and sulfonation and polymer isolation was conducted as described in Example 15. The polymeric sulfonic acid contained 32.8 meq. of free sulfonic acid per 100 of polymer according to sulfur analysis. The polymeric sulfonic acid was mixed according to the formulations in Table XXVII. In every case the neutralizing agent was added last. Tensile pads and samples for melt index were molded 15 minutes at 350° F. The room temperature tensile properties and the melt index at 190° C. and 250 psi are given in Table XXVII.

This example demonstrates that lower melt viscosities are achievable through the use of a lower Mooney EPDM. Also demonstrated are the use of two carbon blacks, three mineral fillers, three oils, three metal stearates and four metal oxide neutralizing agents, wherein up to 50 parts of a metal stearate neutralizing agent was used.

TABLE XXVII

| Sulfonated V-2504 | 100 | 100 | 100 | 100 | 100 | 100 | 100 | 100 | 100 |
|---|---|---|---|---|---|---|---|---|---|
| Thermex (MT Black) | 150 | — | — | — | — | — | — | — | — |
| Philblack E (SAF Black) | — | — | — | — | — | — | 150 | — | — |
| Atomite | — | 100 | — | — | — | — | — | — | — |
| Mistron Vapor | — | — | 100 | — | — | — | — | — | — |
| HiSil 215 | — | — | — | 100 | — | 100 | — | — | — |
| Sunthene 4240 | 100 | — | — | — | — | — | 100 | 100 | 100 |
| Sundex 790 | — | 50 | — | 50 | — | — | — | — | — |
| Sunpar 2280 | — | — | 50 | — | — | 50 | — | — | — |
| Zinc Stearate | 28.5 | — | — | 50 | 50 | — | — | — | — |
| Magnesium Stearate | — | 26.6 | — | — | — | — | — | — | — |
| Lead Stearate | — | — | 35 | — | — | — | — | — | — |
| Zinc Oxide | — | — | — | — | — | 5 | — | — | — |
| PbO$_2$ | — | — | — | — | — | — | 5 | — | — |
| Pb$_3$O$_4$ | — | — | — | — | — | — | — | 5 | — |
| Magnesium Oxide | — | — | — | — | — | — | — | — | 5 |
| Tensile Strength, psi. | 260 | 1050 | 1140 | 780 | 2960 | 620 | 950 | 880 | 1120 |
| Elongation, % | 330 | 720 | 320 | 430 | 615 | 90 | 270 | 260 | 350 |
| Melt Index (190° C., 250 psi), g/10 minutes | 0.4* | 2.2 | 15.4 | 5.3 | 10.4 | 0 | 0.15 | 0.5 | 0 |

*At 6.5 psi

EXAMPLE 17

One hundred grams of Butyl HT 1066, a chlorinated Butyl rubber, was dissolved in 1000 ml of hexane. To the cement was added 60.8 mmoles acetic anhydride followed by 37.5 mmoles of concentrated sulfuric acid. After 30 minutes stirring at room temperature the sulfonation was terminated through the addition of 100 ml of methanol. Antioxidant 2246 (0.5 g) was added, and the cement was isolated and dewatered as described in Example 15. The polymeric sulfonic acid contained 10 meq. of sulfonic acid/100 polymer and was mixed according to the formulations in Table XXVIII. In every case the neutralizing agent was added last. Tensile test pads and samples for melt index were molded 15 minutes at 350° F. The room temperature tensile properties and the melt index at 190° C. and 250 psi are given in Table XXVIII.

This example demonstrates the use of chlorinated Butyl rubber containing as little as 10 meq. of sulfonic acid per 100 of polymer.

TABLE XXVIII

| Sulfonated Butyl HT 1066 | 100 | 100 | 100 | 100 |
|---|---|---|---|---|
| Philblack E (SAF Black) | — | — | 75 | — |
| Philblack O (HAT Black) | — | — | 75 | — |
| Dixie Clay | — | — | — | 100 |
| Sunpar 2280 | — | — | 100 | — |
| Zinc Stearate | 28.5 | 50 | — | 28.5 |
| Lithium Stearate | — | — | 26.1 | — |
| Tensile Strength, psi | 480 | 360 | 60 | 175 |
| Elongation, % | 800 | 750 | 130 | 800 |
| Melt Index (190° C., 250 psi), g/10 minutes | 0.3 | 7.7 | 0 | 0.03* |

*At 6.5 psi

EXAMPLE 18

A commercial terpolymer, Nordel 1320, a terpolymer of ethylene, propylene and 1,5-hexadiene, was used in this example. Five sulfonations were made. Neat acetyl sulfate was prepared as described in Example 9. Sulfonations were effected at 50° C. for a period of 60 minutes in heptane solvent at a Nordel 1320 concentration of 70 g/liter heptane. Sulfonations were terminated with 5 volume % isopropanol containing Antioxidant 2246. The sulfonated polymers were isolated and dewatered as described in earlier examples.

Sulfonate contents were determined by both sulfur analysis and titration. In the titration 5.0 g of sulfonated polymer was dissolved in 95 ml toluene and 5 ml methanol, and the solution was titrated with 0.1 N ethanolic NaOH to an alizarin-thymolphthalein end-point. The results of the sulfonations are given in Table XXIX.

The results of the analyses show that the Type II unsaturation (symmetrically disubstituted olefin) contained in Nordel 1320 is more difficult to sulfonate than the Type IV unsaturation derived from 5-ethylidene-2-norbornene in the Vistalon EPDM's.

These five polymeric sulfonic acids were mixed on a rubber mill with 3 equivalents of magnesium stearate per equivalent of sulfonic acid in a gum and oil black formulation.

| Gum | | Oil Black | |
|---|---|---|---|
| Polymer | 100 | Polymer | 100 |
| Magnesium Stearate | Var. | Pelletex NS (SRF Black) | 75 |
| | | Philblack A (FEF Black) | 75 |
| | | Flexon 845 | 100 |
| | | Magnesium Stearate | Var. |

The mixed formulations were molded for 10 minutes at 350° F. into micropads for testing and 8 minutes at 350° F. into 70 mil 2-inch × 6-inch plaques for rheological studies. Tensile data are given in Table XXX, and rheological properties are shown in Table XXXI.

TABLE XXIX

SULFONATION OF NORDEL 1320

| | | From Titration | From Sulfur Analysis | |
|---|---|---|---|---|
| Example Number | Acetyl Sulfate Mmole/100 g. Nordel | SO$_3$H Content, Meq/100 g | SO$_3$H Content, Meq/100 g | Reagent Conversion, % |
| 18-A | 40.0 | 21.8 | 16.9 | 42 |

TABLE XXIX-continued

SULFONATION OF NORDEL 1320

| Example Number | Acetyl Sulfate Mmole/100 g. Nordel | From Titration SO3H Content, Meq/100 g | From Sulfur Analysis SO3H Content, Meq/100 g | Reagent Conversion, % |
|---|---|---|---|---|
| 18-B | 50.0 | 25.4 | 21.3 | 43 |
| 18-C | 60.0 | 25.6 | 22.2 | 37 |
| 18-D | 70.0 | 20.9 | 25.0 | 36 |
| 18-E | 80.0 | 32.6 | 31.3 | 39 |

TABLE XXX

TENSILE PROPERTIES OF BULK NEUTRALIZED SULFONATED NORDEL 1320

| Example | Room Temperature Tensile Strength, psi | 300% Modulus, psi | Elongation, % | 100° C. Tensile Strength, psi | 300% Modulus, psi | Elongation, % |
|---|---|---|---|---|---|---|
| Gum Formulation | | | | | | |
| 18-D | 3650 | 590 | 705 | — | — | — |
| 18-E | 4120 | 620 | 710 | — | — | — |
| Oil Black Formulations | | | | | | |
| 18-A | 560 | 390 | 690 | 90 | — | 410 |
| 18-B | 670 | 440 | 750 | 170 | 140 | 450 |
| 18-C | 830 | 540 | 780 | 180 | 150 | 470 |
| 18-D | 730 | 455 | 700 | 190 | 170 | 420 |
| 18-E | 860 | 500 | 660 | 205 | 170 | 440 |

TABLE XXXI

RHEOLOGY SUMMARY OF BULK NEUTRALIZED SULFONATED NORDEL 1320

At $0.74$ sec$^{-1}$

| Example | Shear Stress, Dynes/cm$^2$ × 10$^{-5}$ | Viscosity Poise × 10$^{-5}$ | Shear Rate At Fracture, sec$^{-1}$ |
|---|---|---|---|
| Gum Formulations | | | |
| 18-A | 11.2 | 15.1 | 735 |
| 18-B | 10.1 | 13.6 | 735 |
| 18-C | 13.1 | 17.7 | 295 |
| 18-D | 11.5 | 15.5 | 753 |
| 18-E | 10.4 | 14.1 | 735 |
| Oil Black Formulations | | | |
| 18-A | 2.0 | 2.7 | >2940 |
| 18-B | 2.1 | 2.8 | >2940 |
| 18-C | 2.4 | 3.2 | >2940 |
| 18-D | 4.1 | 5.5 | 1470 |
| 18-E | 3.2 | 4.3 | 1470 |

The improved elastomeric blend compositions prepared by the process of this invention can be fabricated into a plurality of useful articles. For example, wire, film, washer hose and radiator hose can be made by an extrusion process from these compositions. The compositions can be used for shoe heels. Sight shields, screw driver handles, spark plug covers and automobile bumper assemblies can all be made by injection molding process.

Since many modifications and variations of this invention may be made without departing from the spirit or scope of the invention thereof, it is not intended to limit the spirit or scope thereof to the specific examples thereof.

What is claimed is:

1. A process for forming an elastomeric blend composition of a neutralized sulfonated elastomeric polymer having about 10 to about 60 meq. of sulfonate groups per 100 grams of said neutralized sulfonated elastomeric polymer, which consists of the steps of:
   (a) mixing, in the absence of solvent, at least one additive with an unneutralized form of said sulfonated elastomeric polymer to form a mixture, said additive being selected from the group consisting of fillers and oils and mixtures thereof;
   (b) compounding said mixture at a temperature of less than about 150° F., thereby forming a homogeneous blend;
   (c) adding a neutralizing agent in the absence of solvent to said homogeneous blend and further compounding said homogeneous blend at less than about 150° F. for a sufficient period of time to completely neutralize said unneutralized form of said sulfonated elastomeric polymer, thereby forming said blend composition of at least one said additive and said neutralized sulfonated elastomeric polymer, wherein said sulfonate group of said sulfonated elastomeric polymer are completely neutralized.

2. An improved process according to claim 1, wherein said filler is carbon black.

3. An improved process according to claim 1, wherein said neutralizing agent is a basic salt of a carboxylic acid, a counterion of said salt being selected from the group consisting of aluminum, lead, iron, ammonium, Groups I-A, II-A, I-B and II-B of the Periodic Table of Elements and mixtures thereof.

4. An improved process according to claim 1, wherein said neutralizing agent is a metal stearate with a cation of said metal stearate being selected from lithium, sodium, barium, zinc, magnesium, lead and calcium.

5. An improved process according to claim 1, wherein said neutralizing agent is a metallic oxide.

6. An improved process according to claim 5, wherein said metallic oxide is zinc oxide, magnesium oxide, lead peroxide, and red lead (Pb$_3$O$_4$).

7. An improved process according to claim 1, wherein said elastomeric polymer is selected from the group consisting of EPDM terpolymers, butyl rubbers, and halo-butyl rubbers.

8. An improved process according to claim 1 wherein said sulfonated elastomeric polymer is derived from an EPDM terpolymer having a Mooney viscosity (212° F., M.L. 1+8) of about 5 to about 60.

9. The process according to claim 1 further comprising the addition of at least 10 parts by weight of an ionic domain plasticizer per 100 parts of said sulfonated elastomeric polymer to said homogeneous blend, said ionic domain plasticizer being added to either said mixture or simultaneously with said neutralizing agent to said homogeneous blend, said ionic domain being a metal carboxylate.

10. The process according to claim 9 wherein said metal carboxylate is zinc stearate.

11. The improved process according to claim 1, wherein at least one said additive is a mixture of at least one non-polar process oil and at least one filler, said filler being selected from the group consisting of carbon black, calcium carbonate, talc, silica and a clay and mixtures thereof, said oil having less than 6 wt. % polar type compounds.

12. The improved process according to claim 11, wherein a concentration of said filler is about 5 to about 300 parts by weight per 100 parts of said sulfonated elastomeric polymer and a concentration of said non-polar process oil is about 20 to about 200 parts by weight per 100 parts of said sulfonated elastomeric polymer.

13. The improved process according to claim 1, wherein said additive is a non-polar process oil at a concentration level of about 20 to about 200 parts by weight per 100 parts of said sulfonated elastomeric polymer, said non-polar process oil having less than about 6 wt. % polar type compounds.

* * * * *